United States Patent
Libich

(10) Patent No.: US 9,152,707 B2
(45) Date of Patent: Oct. 6, 2015

(54) SYSTEM AND METHOD FOR CREATING AND PROVIDING MEDIA OBJECTS IN A NAVIGABLE ENVIRONMENT

(76) Inventor: Martin Libich, Marina Del Rey, CA (US)

( * ) Notice: Subject to any disclaimer, the term of this patent is extended or adjusted under 35 U.S.C. 154(b) by 815 days.

(21) Appl. No.: 12/651,545

(22) Filed: Jan. 4, 2010

(65) Prior Publication Data

US 2011/0167069 A1 Jul. 7, 2011

(51) Int. Cl.
*G06F 17/30* (2006.01)

(52) U.S. Cl.
CPC .... *G06F 17/30817* (2013.01); *G06F 17/30849* (2013.01)

(58) Field of Classification Search
CPC .............. G06F 17/30817; G06F 17/30849
USPC ........................................................ 707/741
See application file for complete search history.

(56) References Cited

U.S. PATENT DOCUMENTS

| | | | |
|---|---|---|---|
| 6,324,338 B1 * | 11/2001 | Wood et al. | 386/291 |
| 7,460,149 B1 * | 12/2008 | Donovan et al. | 348/143 |
| 7,936,484 B2 * | 5/2011 | Roncal | 358/402 |
| 7,983,927 B2 * | 7/2011 | McGill et al. | 705/1.1 |
| 8,027,668 B2 * | 9/2011 | Behzad et al. | 455/414.3 |
| 2007/0268310 A1 * | 11/2007 | Dolph et al. | 345/629 |
| 2008/0126961 A1 * | 5/2008 | Naaman et al. | 715/764 |
| 2008/0215984 A1 * | 9/2008 | Manico et al. | 715/730 |
| 2009/0048927 A1 * | 2/2009 | Gross | 705/14 |
| 2009/0063419 A1 * | 3/2009 | Nurminen et al. | 707/3 |
| 2009/0322881 A1 * | 12/2009 | Shu et al. | 348/148 |
| 2010/0274674 A1 * | 10/2010 | Roberts et al. | 705/14.73 |
| 2011/0010623 A1 * | 1/2011 | Vanslette et al. | 715/704 |
| 2011/0060993 A1 * | 3/2011 | Cotter et al. | 715/720 |
| 2014/0160315 A1 * | 6/2014 | Gallagher et al. | 348/231.5 |

* cited by examiner

*Primary Examiner* — Brannon W Smith

(74) *Attorney, Agent, or Firm* — Cotman IP Law Group, PLC

(57) ABSTRACT

A system and method for storing and providing media objects in a navigable environment implemented on at least one computer executing computer readable program code stored in a tangible memory medium. The at least one computer is configured to access a plurality of media objects comprising a media recording and metadata. The at least one computer is further configured to generate an index of said plurality of media objects based on said metadata.

20 Claims, 8 Drawing Sheets

SYSTEM AND METHOD FOR CREATING AND PROVIDING MEDIA OBJECTS IN A NAVIGABLE ENVIRONMENT

BACKGROUND OF THE INVENTION

1. Field of the Invention

Embodiments of the invention described herein pertain to the field of computer systems. More particularly, but not by way of limitation, one or more embodiments of the invention enable a system and method for creating and providing media objects in a navigable environment.

2. Description of the Related Art

Advancements in networking technologies have facilitated the self-publication of user-created content. Average computer users are able to publish digital media over a network, such as the Internet. Available systems, such as the system accessible at youtube.com, provide a platform for users to self-publish media. Such media includes audio recordings, video recordings, audio-video recordings, and other digital media recordings or recordings convertible to a digital format.

In addition, advancements in digital recording technologies have brought about the ability for the average consumer to produce publishable materials. These digital recording technologies include photo cameras, video recorders, audio recorders, audio-video recording devices, and other device capable of recording live media. These recording devices are easy to use, portable, and offer network connectivity which in turn facilitates the creation of media and the publication of user-created media over a network, such as the Internet.

Currently, published media is created, stored and provided with limited context. Published media is typically created, stored and presented as a continuous stream. Authors are not given an incentive to portray a small set of events, entities, thoughts, ideas or concepts in each piece of published media. Because authors are not given incentive to portray such concepts in their recorded media, the recorded media resembles streams of media content rather than media objects.

Furthermore, authors using text to provide context about the stream of media content are limited only to words describing the content. Additional information such as viewership statistics and/or feedback information is sometimes used to provide more information about the context of the media content. Streams of content are harder to describe using concrete terms, which generally facilitates organizing the media by context and relationship.

Published media is also currently provided to viewers with limited context and is not presented in a flexible, navigable environment which provides context about the published media. Rather, published media is searchable based on the limited context information accompanying the published media.

To overcome the problems and limitations described in conjunction with current systems there is a need for a system and method for creating and providing media objects in a navigable environment.

BRIEF SUMMARY OF THE INVENTION

Systems and methods set forth herein are directed to enable a system and method for creating, storing and publishing live media. The media is indexed or otherwise ordered with a high level of conceptual organization. The conceptual organization allows users to view published media in an intuitively navigable environment. Media objects include recorded media and metadata generated to provide more information about the context of recorded media. A recording device used by an author is designed to capture metadata, such as location, orientation, and other information which provides a context for recorded media captured on the recording device. The media objects are published and presented to other users in a flexible, navigable environment based on the context provided by the metadata. The systems and methods set forth provide both an intuitive means to create media objects and to browse published media objects.

Systems and methods for creating and providing media objects in a navigable environment may be used in an educational, medical, emergency response, terrain, entertainment, networking, government, or commercial setting as well as any other setting where recorded media is created and published to a plurality of viewers.

One or more embodiments of the systems and methods set forth herein are directed to enable a system and method for creating and providing media objects in a navigable environment. A media object includes a piece of recorded media such as an audible or visual recording of something. In one or more embodiments, authors are given an incentive to portray a small set of events, entities, thoughts, ideas or concepts in each media object. Authors are further provided with a plurality of intuitive means for associating relationships to the media object. Published media is provided in a navigable environment. Media objects are provided in the navigable environment based on relationships associated with the media object.

Embodiments of systems and methods for creating and providing media objects in a navigable embodiment are directed to methods for receiving and storing media objects in a navigable environment implemented on at least one computer executing computer readable program code stored in a tangible memory medium. The at least one computer is configured to receive a live recording selected by an author, wherein the live recording is recorded on a media capture device. The live recording may be a digital audio-video recording. The length of the live recording may be less than about 60 seconds. Further, the length of the live recording may be less than about 30 seconds. The at least one computer may be further configured to provide an incentive to the author for generating content in accordance with a monetization scheme.

The at least one computer is further configured to receive captured metadata associated with the live recording, wherein the captured metadata is metadata collected by the media capture device comprising a location of recording, a time of recording, and an orientation of the media capture device. The media capture device may comprise a handheld mobile device or any other computational device capable of media capture. The media capture device may extract additional metadata using image processing hardware and image processing software configured to perform at least one task selected from the group of image stabilization, image and sound filtering, object tracking, object recognition, speech recognition, detecting inappropriate media, and adjusting a recording parameter.

The at least one computer is further configured to receive author metadata comprising information about the author. The author metadata may comprise at least one of email, calendar, social information, group affiliation, event participation, and purchase information associated with at least one of the media capture devices and a user account associated with the author.

The at least one computer is further configured to analyze the captured metadata and the author metadata for at least one potential relationship. The at least one potential relationship may include a potentially related media object. The at least one computer may be further configured to verify an authenticity of at least one piece of metadata, including a portion of capture metadata and/or a portion of author metadata. The at least one computer is further configured to provide at least one selection based on the at least one potential relationship to the author. The at least one selection may comprise a selection associated with a sponsor.

The at least one computer may be further configured to extract additional metadata based using image processing software configured to perform at least one task selected from the group of image stabilization, image and sound filtering, object tracking, object recognition, speech recognition, detecting inappropriate media, and adjusting a recording parameter.

The at least one computer may be further configured to receive an initial portion of the live recording, the captured metadata and the author metadata for immediate analysis to determine the at least one selection, wherein the initial portion is received after a starting time of the live recording and wherein the at least one selection is provided before or immediately after an ending time of the live recording.

The at least one computer is further configured to receive at least one chosen selection identified by the author. The at least one computer is further configured to associate at least one potential relationship with the live recording based on the at least one chosen selection, wherein the at least one potential relationship is stored as relationship metadata. The at least one computer is further configured to create a media object comprising the live recording, the captured metadata, the author metadata and the relationship metadata. The at least one computer may be further configured to update the relationship metadata with new relationship data processed after creation of the media object.

Additionally, embodiments of systems and methods for creating and providing media objects in a navigable embodiment are directed to methods for storing and providing media objects in a navigable environment implemented on at least one computer executing computer readable program code stored in a tangible memory medium. The at least one computer is configured to access a plurality of media objects, each media object comprising a media recording, capture metadata, author metadata and relationship metadata. The at least one computer is further configured to generate an index of the plurality of media objects based on the relationship metadata, captured metadata and author metadata. The index may be updated at a time after creation of the media object based on new relationship information.

The at least one computer is further configured to provide a view of a navigable virtual environment in two or more dimensions. The two or more dimensions may include a time dimension. The view may be playable, wherein a playable view includes a reference path comprising an orientation and a location within the navigable virtual environment. The navigable virtual environment may be provided by a user. For example, a user may design the navigable environment. The navigable virtual environment may comprise a virtual representation of an organized event. Authentication may be required for access to view and add media objects to a specific navigable virtual environment.

The at least one computer is further configured to provide at least one media object in the view. The at least one media object may be provided as a media preview object comprising a representation of a media object with a smaller file size than the media object. The at least one computer may be further configured to use at least one filter selection to filter the at least one media object provided, wherein the at least one media object provided comprises relevant media objects which are relevant to the at least one filter selection. The filter selection may comprise a sponsor filter selection. The at least one computer may be further configured to provide an incentive to a user to view sponsored content which is relevant to the sponsor filter selection.

Additionally, embodiments of systems and methods for creating and providing media objects in a navigable embodiment are directed to a tangible computer readable medium comprising computer executable program code for generating media objects in a navigable environment, wherein a media object is generated using the chosen selection and the object data.

The computer executable program code comprises instructions to generate a live recording comprising captured data, wherein the captured data is recorded using at least one recording device. The live recording may be stored in a portion of a tangible computer readable memory, wherein the portion comprises a predetermined size for storing continuously recorded live media, and wherein older recorded data is discarded when a size of the live recording reaches the predetermined size. The computer executable program code further comprises instructions to accept a choice of a selected portion of the live recording by a user.

The computer executable program code further comprises instructions to generate capture metadata associated with the selected portion of the live recording, wherein the captured metadata comprises a location, a time and an orientation associated with the selected portion of the live recording. The computer executable program code further comprises instructions to generate author metadata comprising information about the user.

The computer executable program code further comprises instructions to provide object data comprising the selected portion of the live recording, the capture metadata and the author metadata for analysis to determine at least one selection. The computer executable program code further comprises instructions to receive at least one selection in response to the object data. The computer executable program code further comprises instructions to accept at least one chosen selection from the user through an interface. The computer executable program code further comprises instructions to provide the at least one chosen selection.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A system and method for creating and providing media objects in a navigable environment will now be described. In the following exemplary description numerous specific details are set forth in order to provide a more thorough understanding of the invention disclosed herein. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
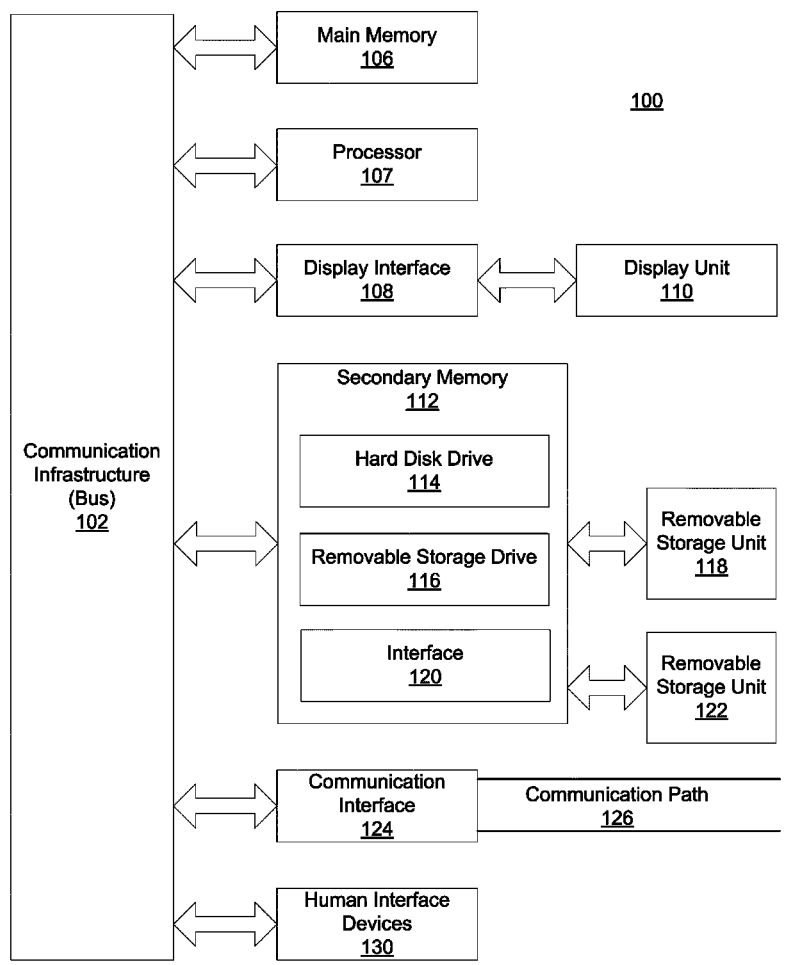
FIG. 1 diagrams a general-purpose computer and peripherals that when programmed as described herein may operate as a specially programmed computer capable of implementing one or more methods, apparatus and/or systems of the solution.

FIG. 1 diagrams a system 100 comprising a general-purpose computer and peripherals that when programmed as described herein, may operate as a specially programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for accessing and executed stored data and applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as Secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication path 126 may comprise any type of telecommunication network or interconnection fabric that can transport data to and from communication interface 124.

To facilitate user interaction with the specially programmed computer system, one or more human interface devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

In one or more embodiments of systems and methods for creating and providing media objects in a navigable environments, media objects are stored over a distributed computer system comprising a plurality of computer systems, such as system 100, connected via a network, such as by communication path 126. For example, a plurality of computer systems may be connected by a peer-to-peer file sharing protocol, wherein an index or another method for tracking media objects is maintained.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. Where a virtual machine, process, device or otherwise performs substantially similarly to that of a physical computer system, such a virtual platform will also fall within the scope of disclosure provided herein, notwithstanding the description herein of a physical system such as that in FIG. 1.

One or more embodiments are configured to enable the specially programmed computer to take the input data given and transform it into a web-based UI by applying one or more of the methods and/or processes described herein. Thus the methods described herein are able to transform a stored component into a web UI, using the solution disclosed here to result in an output of the system as a web UI design support tool, using the specially programmed computer as described herein.

Figure 3:
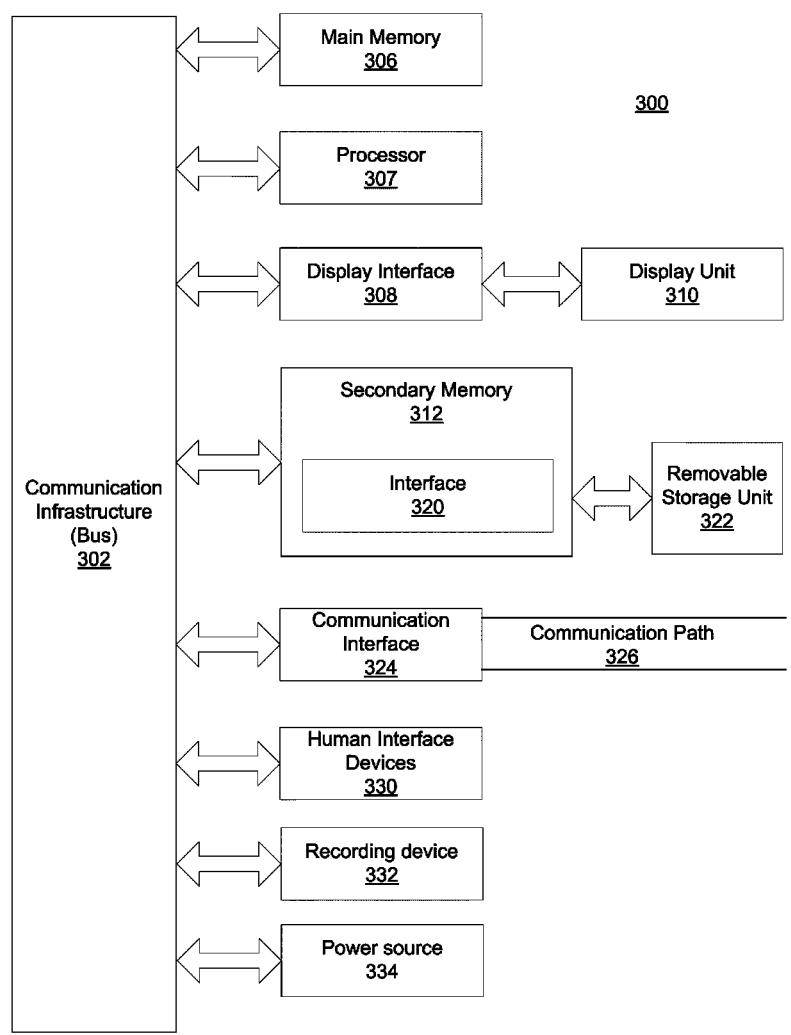
FIG. 3 diagrams an exemplary media capture device in accordance with one or more embodiments of systems and methods to create and provide media objects in a navigable environment.

FIG. 3 diagrams an exemplary media capture device configured to create and provide media objects in a navigable environment. Media capture device 300 is any device capable of capturing live media. In one or more embodiments, media capture device 300 is a mobile device. As used herein, the term "mobile device" refers to any handheld device, such as a mobile phone, a camera, a camcorder, a smart phone, a personal digital assistant (PDA), a mobile computer, or any other handheld device. Additionally, many of the features functions and benefits of the innovation can be applied to desktop computers and networks without departing from the spirit and/or scope of the innovation.

The components of media capture device 300 may be programmed as described herein to operate as a specially programmed computer capable of implementing one or more embodiments of systems and methods to create and provide media objects in a navigable environment. Processor 307 may be coupled to a bi-directional communication infrastructure such as communication infrastructure system bus 302. Communication infrastructure 302 may generally be a system bus that provides an interface to the other components such as processor 307, main memory 306, display interface 308, secondary memory 312 and/or communication interface 324.

Main memory 306 may provide a computer readable medium for accessing and executed stored data and applications. Display interface 308 may communicate with display unit 310 that may be utilized to display outputs to the user of the specially- programmed computer system. Display unit 310 may comprise one or more monitors that may visually depict aspects of the computer program to the user. Main memory 306 and display interface 308 may be coupled to communication infrastructure 302, which may serve as the interface point to secondary memory 312 and communication interface 324. Secondary memory 312 may provide additional memory resources beyond main memory 306, and may generally function as a storage location for computer programs to be executed by processor 307. Either fixed or removable computer-readable media may serve as secondary memory 312. Secondary memory 312 may comprise, for example, hard disks, flash memory, removable storage, or any other data storage medium. There may be multiple sources of secondary memory 312 and systems implementing the solutions described in this disclosure may be configured as needed to support the data storage requirements of the user and the methods described herein. Secondary memory 312 may also comprise interface 320 that serves as an interface point to additional storage such as removable storage unit 322. Numerous types of data storage devices may serve as repositories for data utilized by the specially programmed computer system. For example, magnetic, optical or magnetic-optical storage systems, or any other available mass storage technology that provides a repository for digital information may be used.

Communication interface 324 may be coupled to communication infrastructure 302 and may serve as a conduit for data destined for or received from communication path 326. A network interface card (NIC) is an example of the type of device that once coupled to communication infrastructure 302 may provide a mechanism for transporting data to communication path 326. Computer networks such Local Area Networks (LAN), Wide Area Networks (WAN), Wireless networks, optical networks, distributed networks, the Internet or any combination thereof are some examples of the type of communication paths that may be utilized by the specially program computer system. communication path 326 may comprise any type of telecommunication network or interconnection fabric that can transport data to and from communication interface 324.

To facilitate user interaction with the specially programmed computer system, one or more human interface devices (HID) 330 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

Media capture device 300 further comprises one or more recording device 332, such as a photo camera, video recorder, audio recorder, audio-video recording device, or any other device which is capable of recording live media. Recording device 332 may record one or more live events in a digital format, including any format capable of being represented digitally. Recording device 332 may store data captured by recording device 332 in main memory 306 or secondary memory 312.

Media capture device 300 further comprises power source 334. Power source 334 may be a battery which provides at least a portion of power used by media capture device 300. Power source 334 may be wired or portable.

Figure 8:
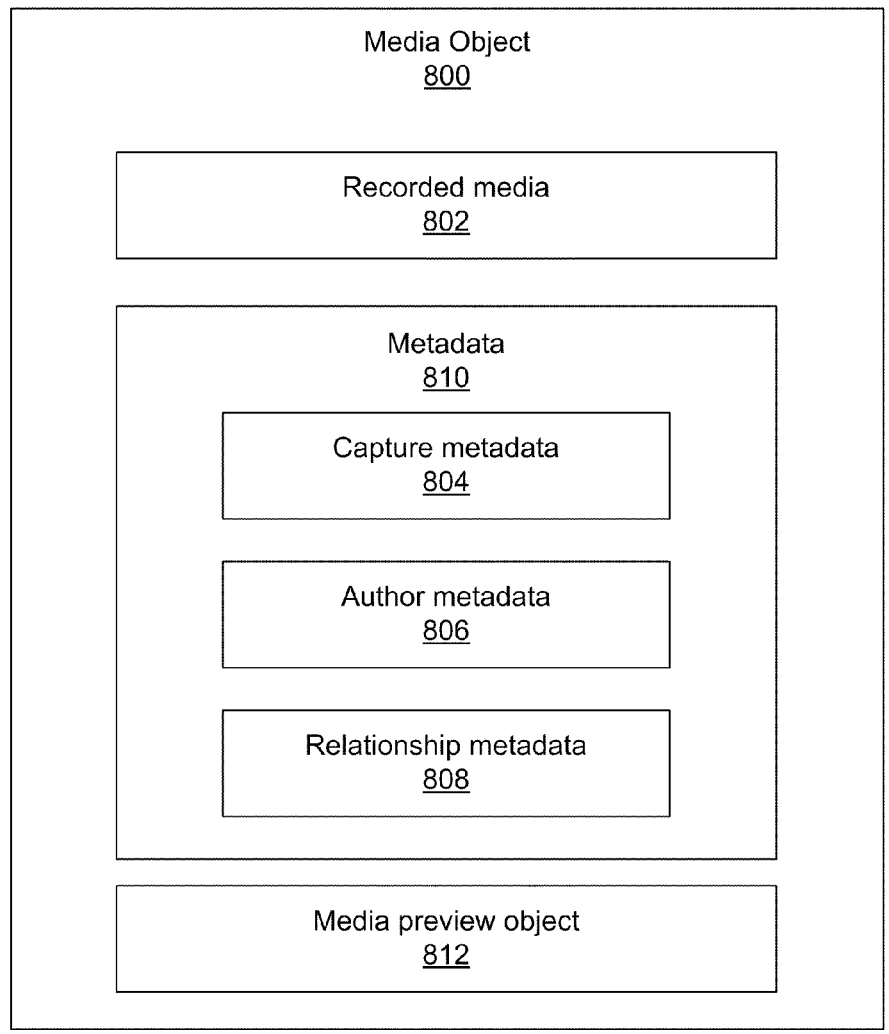
FIG. 8 diagrams a media object in accordance with one or more embodiments of systems and methods to create and provide media objects in a navigable environment.

FIG. 8 diagrams a media object in accordance with one or more embodiments of the systems and methods configured to create and provide media objects in a navigable environment. Media object 800 includes recorded media 802. In one or more embodiments, recorded media 802 is a short clip of live media recorded by a media capture device. In one or more embodiments, a length of recorded media 802 is less than or equal to about 60 seconds. The length of recorded media 802 may be further limited to less than or equal to about 30 seconds. Although any length of recorded media 802 is acceptable, limiting the length of recorded media 802 is meant to encourage an author to emphasize a small set of events, entities, thoughts, ideas or concepts in the recorded media 802 selected for publication. Recorded media 802 comprises a continuous or time-lapse recording taken on a media capture device. In one or more embodiments, recorded media 802 must be a live recording. As used herein, the term "live recording" refers to a recording taken in real time using a media capture device. Media object 800 may be configured to allow or disallow the inclusion of edited content as recorded media 802. In one or more embodiments, the format of media object 802 is uniform across every media object handled by the system. The format includes, but is not limited to, file format, size, quality, length, and any other characteristic of a digital media recording. Uniformity may be enforced as a threshold, such as a minimum or maximum setting, or a requirement. For example, media capture devices may be configured to record in a uniform format to enforce uniformity of media objects in the system.

Media object 800 further includes metadata 810. As used herein, the term "metadata" refers to any data associated with a media object and/or the recorded media associated with the media object. Metadata 810 is used to identify relationships between media objects and to present media objects based on those relationships. In one or more embodiments, metadata 810 is automatically associated with recorded media 802. Intuitive means are further provided for a user to add metadata 810 about recorded media 802 in media object 800. Metadata 810 is added to media object 800 both at the creation of media object 800 as well as after the creation of media object 800.

Metadata 810 includes captured metadata 804. Captured metadata comprises information collected by a media capture device at the time of recording of a live recording. For example, a time (or range of times) and date may be associated with the recording. Location information may also be associated with the recording. Some examples of the type of location information that may be associated with a recording include GPS coordinates, an address, a landmark, a building, a recreational area, and any other means of identifying a location. An orientation may also be associated with the recording, including but not limited to a direction, angle and/or elevation in which the recording device is positioned or pointed. A movement may also be associated with the recording, including a multi-dimensional path over time.

Extrinsic information such as that which is linkable to captured metadata 804, including a time and/or location, may be used to generate additional metadata 810 for media object 800. Extrinsic information which is linkable to captured metadata 804 may include news events, accidents, scheduled events, event information, sponsored events, promotional events, map information, location information, and any other extrinsic information.

Captured metadata 804 may be used to ensure that recorded media 802 is a live recording. In one or more embodiments, media object 800 is configured to disallow the modification of captured metadata 804. For example, a media capture device may be configured to verify captured metadata 804 has not been modified and/or that recorded media 802 is a live recording. Security measures may be used to verify that captured metadata 804 is indeed authentic.

Metadata 810 may further include author metadata 806. Author metadata comprises information associated with the creator of media object 800. The creator of media object may be an individual, a group, a non-profit, a business entity, a government, or any other entity. Authorship metadata may be associated with a registered user or a registered media capture device. In one or more embodiments, a user may associate a user account or a recording device with the user's email, calendar, social information, group affiliation, participation in an event, purchase information, or any other information. This information may be used to enhance author metadata 806, capture metadata 804 or any other metadata 810 associated with media object 800.

In one or more embodiments, authorship information is verified. A secure method may be used to fingerprint media object 800 to provide verifiable authorship information. Authorship may be verified by requiring user authentication by one of any method of authentication known in the art. Authorship information may also be included based on the unique hardware identification of a media capture device on which the media object was created. In one or more embodiments, more than one level of verification of authorship information is provided.

In one or more embodiments, fingerprinting and/or verification are further expanded to ensure that media objects contain live media. To ensure that media object 800 contains live media, the creation of media objects may be restricted to recordings of live media captured on a media capture device configured to provide a verified timestamp indicating the time of recording of the live media.

Metadata 810 may further include relationship metadata 808. Relationship metadata comprises data identifying relationships between a media object and concepts and/or other media objects. Relationship metadata 808 includes associations between media object 800 and words, icons, pictures, video, media objects, or any other way of describing a concept to which media object 800 may be associated. Relationship metadata 808 includes information determined upon the creation of media object 800. Relationship metadata 808 may be modified over time to reflect relationships determined by further analysis, including the analysis of media objects created after the creation of media object 800. Relationship metadata 808 may comprise an index, wherein a relationship indexing service may access media object 800 through the index. Relationship analysis may be conducted using methods which include, but are not limited to, neural networks, heuristics, semiotic algorithms, semantic algorithms, relational databases, indexing, and any other computational technique to determine and store relationship information associating relationship metadata 808 for at least one media object.

In one or more embodiments of the system, media objects are tracked and/or indexed based on their relationships. Although not required, indexing based on relationships helps optimize user guidance and reduce database complexity. The indexing of each media object may be continuously enhanced after the creation of the media object. For example, relationship and connection information used to index a media object may be enhanced by associations made by authors of new media objects, associations determined based on viewership, associations determined based on viewer responses, and any other means for enhancing associations based on information obtained and/or processed after the creation of the media object.

Media object 800 may include media preview object 812. Media preview object 812 comprises a representation of recorded media 802. Media preview object 812 comprises a representation of recorded media 802 in a condensed format. Media preview object 812 may be an icon, a selected frame, a selected portion of recorded media 802, an altered version of recorded media 802, or any other representation of media preview object 812. For example, media preview object 812 may contain a version of recorded media 802 at a lower resolution or an altered frame rate, including an animation of selected frames of recorded media 802. Media preview object 812 may comprise a conversion method usable to convert recorded media 802 to a condensed format in real time as the media object 800 is being displayed to a user.

An author of media object 800 may be provided incentives for generating content in accordance with one or more embodiments of systems and methods to create and provide media objects in a navigable environment. Incentives may be quantified as credits. Credits may allow greater access to content and features of the system, including broader authorship capabilities and distribution of content. Credits may be granted for submitting content in accordance with publishing standards, creating highly viewed content, creating highly rated content, associating media objects with sponsored content, or any other desirable behavior. In one or more embodiments, credits are granted for behavior that maximizes revenue in a monetization scheme.

Figure 4:
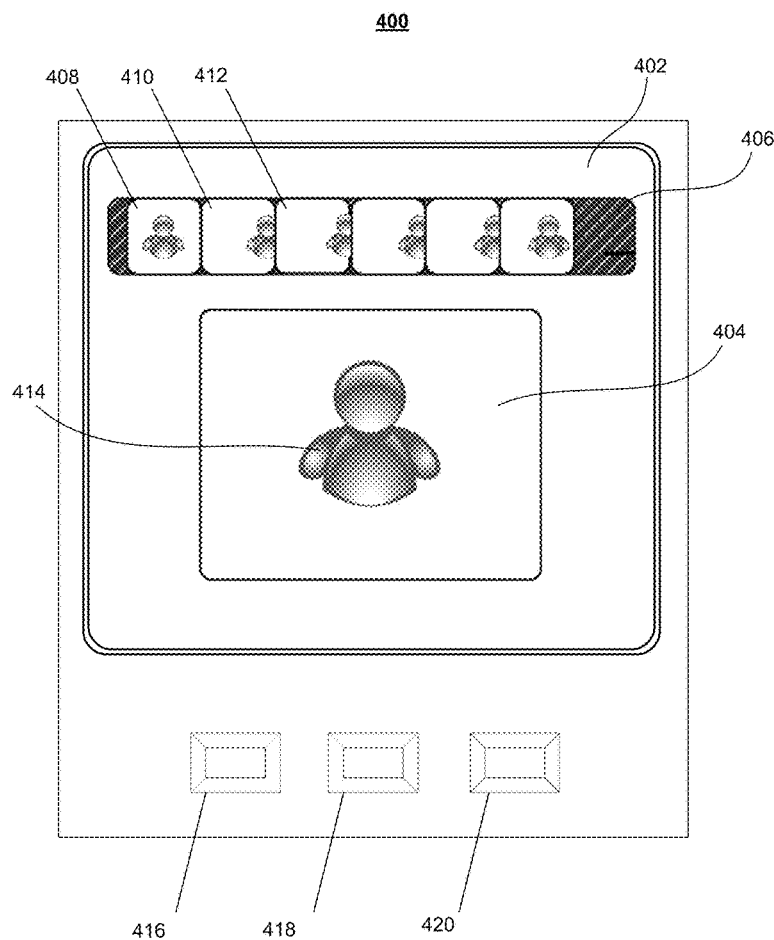
FIG. 4 depicts an interface for selecting recorded media to create a media object using an exemplary media capture device in accordance with one or more embodiments of systems and methods to create and provide media objects in a navigable environment.

FIG. 4 depicts an interface for selecting recorded media to create a media object using an exemplary media capture device in accordance with one or more embodiments of systems and methods to create and provide media objects in a navigable environment. Media capture device 400 comprises one or more recording device, such as a camera, video recorder, audio recorder, audio-video recording device, or any other device which is capable of recording live media. The recording device may record one or more live events in a digital format, including any format capable of being represented digitally. Recorded data is stored in main memory 302 or secondary memory 312. In one or more embodiments, media capture device 400 is configured to continuously record live media using the one or more recording device. A portion of main memory 302 or secondary memory 312 may be apportioned for storing continuously recorded live media when media capture device 400 is configured to continuously record, wherein older recorded data is discarded when the apportioned memory is full.

Media capture device 400 may be configured to receive user input from at least one human interface device 330, such as buttons 416-420. Media capture device 400 includes display 402. In one or more embodiments, display 402 is a touchscreen that serves as a human interface device 330. The touchscreen is capable of receiving user input using resistive, capacitive, or any other touchscreen technology. Media capture device 400 may be configured to interpret one or more gestures made on the screen by a user, including gestures made with a human finger.

Display 402 includes playback region 404. Display 402 is configured to play live media captured by the one or more recording device, such as in playback region 404. Media capture device 400 may also be configured to display a view of live media currently recording in playback region 404. A user of media capture device 400 may control the display of currently recording live media and/or the playback of live media previously recorded using at least one human interface device, such as buttons 416-420. In one or more embodiments, display 402 is a touchscreen that serves as a human interface device.

In one or more embodiments, media capture device 400 is further configured to provide a user the capacity to choose a portion of captured data to create a media object. An intuitive interface for choosing a portion of captured data is provided through display 402 and at least one human interface device, such as buttons 416-420. In one or more embodiments, display 402 is a touchscreen that serves as a human interface device. An exemplary intuitive selection interface is shown. Frame selection interface 406 displays a set of frames 408-412 selected from a previous recording. The set of displayed frames 408-412 are representative of the previous recording. In one or more embodiments, the displayed frames 408-412 are spaced approximately evenly with respect to the duration of the previous recording. The at least one human interface device contains interface devices, such as buttons 416-420 and/or display 402 that allow a user to select a portion of the previous recording to create a media object. The human interface device also allows a user to intuitively play through, rewind, fast-forward, and perform other operations to review and select from the previous recording. In one or more embodiments, frame selection interface 406 allows a user to review and select from all data in an apportioned memory for storing continuously recorded live media, wherein older recorded data is discarded when the apportioned memory is full.

In one or more embodiments, media capture device 400 is further configured to process data captured by the at least one recording device. For example, media capture device 400 may contain hardware and/or software for processing content 414 to enhance the recording quality or to generate metadata associated with the recording. Content 414 may be processed to enhance the recorded data, such as by image stabilization, sound and image filtering, tracking, object recognition, speech recognition, flagging inappropriate media, adjusting a parameter such as volume, white balance and brightness, and any other media processing. Content 414 may be processed in real time as the at least one recording device is recording live media. In one or more embodiments, media capture device 404 is configured to analyze live media recorded by the at least one recording device in real time and adjust the recording device during the recording based on the analysis. Controlling the recording device includes focusing, object tracking, adjusting a recording parameter such as aperture, volume, white balance, brightness, or any other adjustment.

Media capture device 400 is further configured to generate capture metadata associated with a recording of live media. Capture metadata comprises information collected by media capture device 400 at the time of a recording. For example, a time may be associated with the recording. Furthermore, a location may be associated with the recording. A location may include GPS coordinates, an address, a landmark, a building, a recreational area, or any other means of identifying a location. An orientation may also be associated with the recording, including but not limited to a direction, angle and/or elevation in which the recording device is positioned or pointed. A movement may also be associated with the recording, including a multi-dimensional path over time.

In one or more embodiments, media objects are fingerprinted to provide verifiable information about authorship of media objects. Media capture device 400 may be further configured to add authorship information to a media object. Authorship information may be verifiable by requiring user authentication by one of any method of authentication known in the art. Authorship information may also be included based on the unique hardware identification of a media capture device 400 on which the media object was created. In one or more embodiments, more than one level of verification of authorship information is provided. The addition of unverified content may be excluded in systems and methods to create and provide media objects in a navigable environment. In one or more embodiments, fingerprinting and/or verification are further expanded to ensure that media objects contain live media. To ensure that media objects contain live media, the creation of media objects may be restricted to recordings of live media captured on a media capture device configured to provide a verified timestamp indicating the time of recording of the live media.

Figure 5:
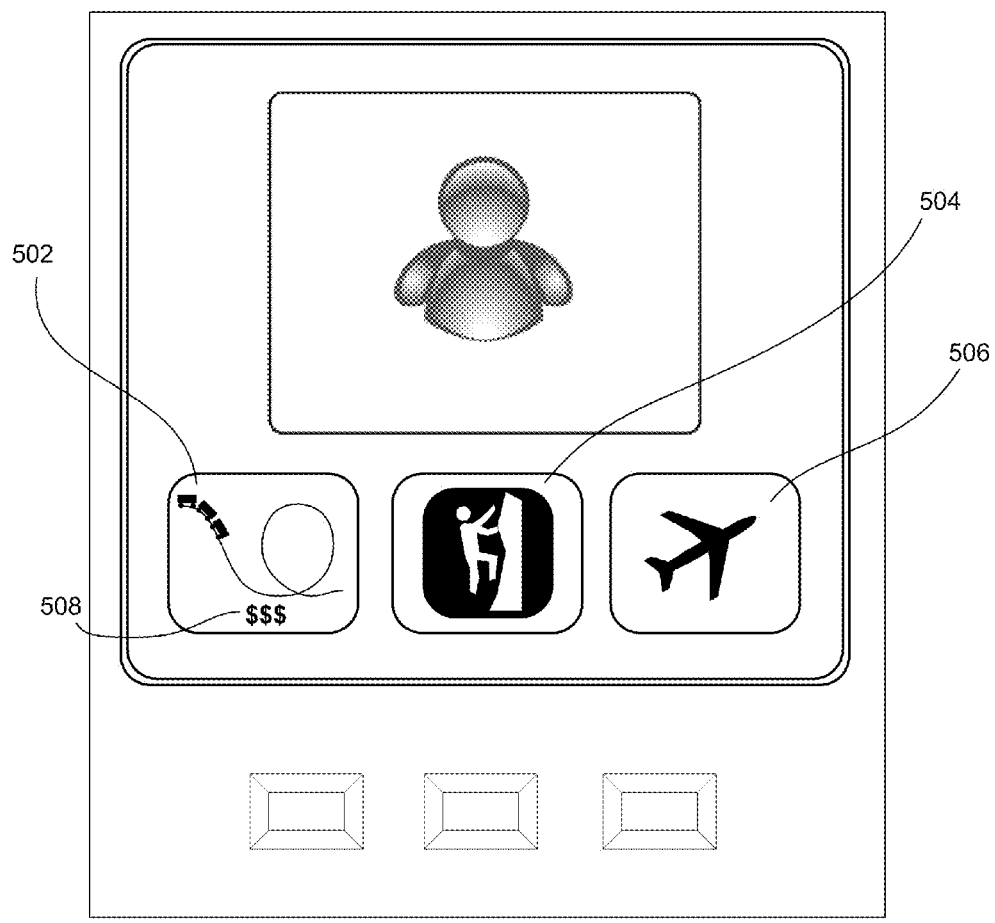
FIG. 5 depicts an interface for adding relationship metadata to a media object using a media capture device in accordance with one or more embodiments of systems and methods to create and provide media objects in a navigable environment.

FIG. 5 depicts an exemplary interface for adding relationship metadata to a media object using a media capture device in accordance with one or more embodiments of systems and methods to create and provide media objects in a navigable environment. The interface is an exemplary intuitive interface that allows an author to quickly associate relationship metadata with a media object.

An author is presented with selections 502-506. Selections 502-506 represent ideas, events, media objects, or any other concept usable to associate relationship metadata with a media object. Selections 502-506 are determined as potentially relevant to the recorded media. Selections 502-506 may represent categories, activities, ideas, events, locations, or any other potentially relevant concept. In one or more embodiments, selections 502-506 are other media objects that are potentially relevant to the media object being created in FIG. 5.

In one or more embodiments, selections 502-506 are provided after analyzing at least a portion of the recorded media. The analysis may be performed on a server. Other information, including capture metadata and author metadata, may be used in an analysis made to determine relevant selections 502-506. In one or more embodiments, at least an initial portion of a media object, such as metadata and/or an initial portion of recorded media, is transferred to a server shortly after a recording is initiated on media capture device 400. Transferring an initial portion of a media object allows for the immediate analysis of the initial portion such that selections 502-506 are determined by the server. The immediate analysis is complete before the completion of the recording on media capture device 400, allowing for selections 502-506 to be provided immediately or shortly after a user completes the recording on media capture device 400.

Selections 502-506 may be presented on display 402. An intuitive selection interface is provided through display 402 and at least one human interface device, such as buttons 416-420. In one or more embodiments, display 402 is a touchscreen that serves as a human interface device. An author may select at least one of selections 502-506. The selection associates relationship metadata with the new media object. Although all of selections 502-506 are displayed on display 402, additional selections may be provided. Additional selections may be accessed through browsing, scrolling, or any other method for displaying additional selections.

Selections 502-506 may represent media objects determined as potentially relevant to the recorded media. In one or more embodiments, selections 502-506 are each presented as a media preview object. The media preview object may be an icon, a selected frame, a selected portion of the associated recorded media, an altered version of the associated recorded media, or any other representation of the associated media object. Selections 502-506 may be presented to the author using a real-time conversion of recorded media in the media objects presented using selections 502-506.

In one or more embodiments, one or more selections 502-506 may be sponsored media. Sponsored media may be designated by a sponsorship icon 508 or any other indicator to notify an author that the selection is associated with sponsored content. Sponsored media comprises media objects submitted by a sponsor user for a fee. A sponsor user may be an individual, a group, a non-profit, a business entity, a government, or any other entity. Sponsored media may comprise media objects as well as ideas, events, or any other concept usable to associate relationship metadata with a media object. The fee paid by a sponsor user may be based on a subscription, a number of media objects, a number of views, a number of selections, a quantified measure of popularity, a quantified measure of connectivity, or any other payment scheme. An author may be provided an incentive to associate sponsored media with the new media object.

In one or more embodiments, an author may optionally add a caption to the media object. The caption may be entered using at least one human interface device, such as buttons 416-420. In one or more embodiments, display 402 is a touchscreen which serves as a human interface device. The caption may be used to determine relationship metadata associated with the media object. The caption may be analyzed prior to providing selections 502-506 as a means to help determine selections 502-506.

Figure 6:
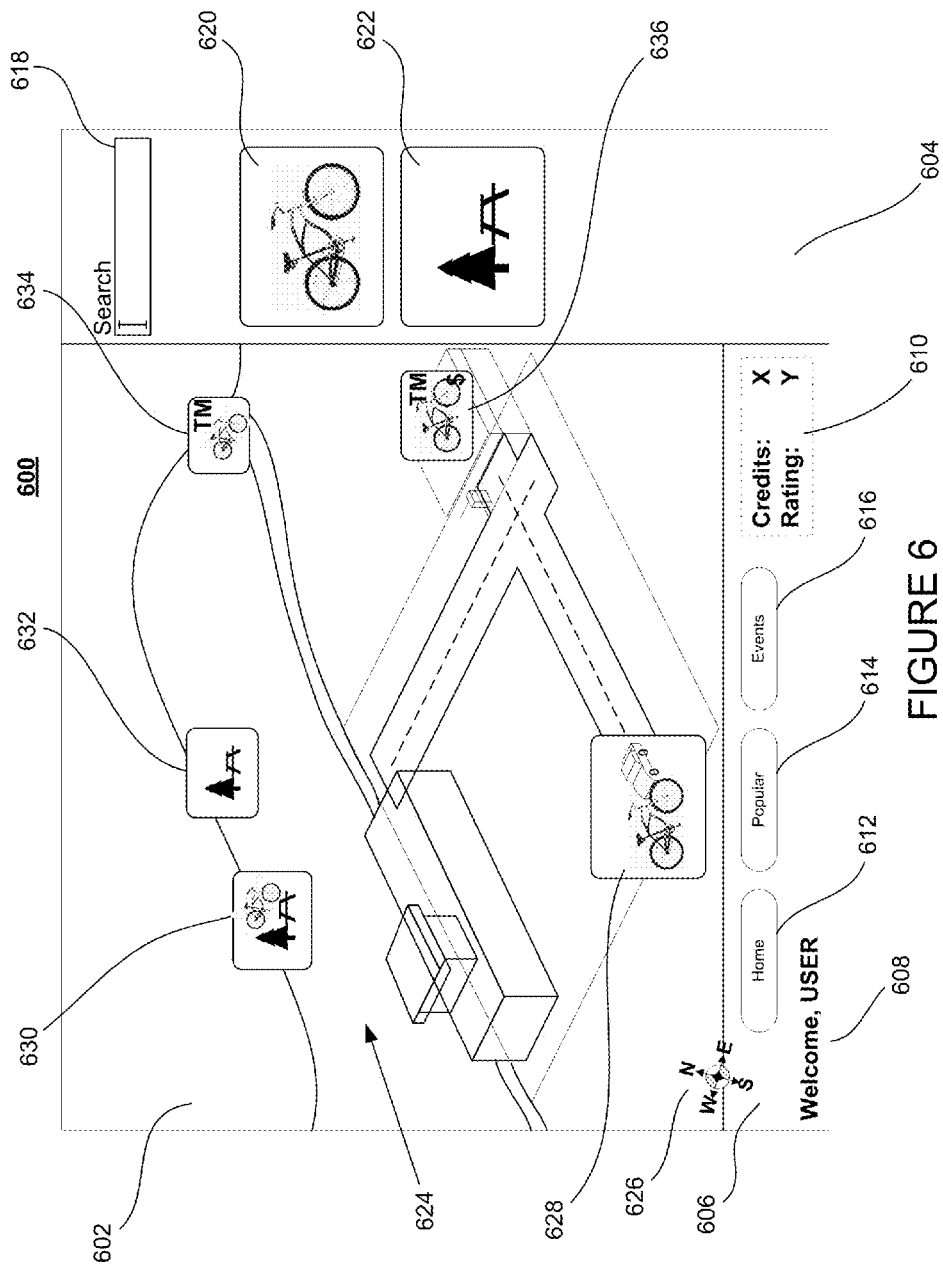
FIG. 6 illustrates an exemplary navigable environment in accordance with systems and methods to create and provide media objects in a navigable environment.

FIG. 6 illustrates an exemplary navigable environment in accordance with systems and methods to create and provide media objects in a navigable environment. Navigation display 600 may be provided on any computing device, such as a mobile phone, a camera, a camcorder, a smart phone, a personal digital assistant (PDA), a computer, a laptop, or any other computing device. In one or more embodiments, navigation display 600 is provided on a display of media capture device as shown in FIGS. 4 and 5.

Navigation display 600 comprises environment display panel 602. Environment display panel 602 is configured to display a navigable environment in which at least one media object 628-636 is displayed. Media objects 628-636 which are within view 624 of an environment displayed in environment display panel 602 are displayed. In FIG. 6, view 624 is a view of a three-dimensional (3D) virtual environment representing real space. View 624 may be a view of any virtual environment in two or more dimensions, wherein the two or more dimensions correspond to a direction in real space and/or time. In one or more embodiments, time is represented in view 624 by a playable view that changes over time. In one or more embodiments, view 624 is shown from a reference path, wherein the reference path includes an orientation and location that changes over time. When time is shown as a dimension of view 624, media objects 628-636 are displayed in view 624 when capture metadata of the media object corresponds to a current view time of view 624.

In one or more embodiments, view 624 is a view of a virtual environment created by a user, including a sponsored user. The virtual environment may be a representation of an organized event, such as an event stage, a building layout, a tradeshow layout, or any other representation of an organized event. A view and/or media objects associated with an organized event may be public or private. Participants in the organized event may be granted access to add and/or view media objects to the virtual environment represented by view 624. Participants may be granted access by requiring user authentication by one of any method of authentication known in the art. In one or more embodiments, a camera or any other imaging device is used to authenticate a participant authorized to add and/or view media objects associated with the organized event by imaging a ticket or other means of entry to the organized event. A portion of the ticket may be imaged, such as a barcode.

Navigation display 600 further comprises content selection panel 604. Content selection panel 604 is configured to allow a user to specify terms in order to filter media objects displayed in view 624. For example, search interface 618 may allow searching by keyword. A keyword search may also be used to find relevant concepts, sponsors, media objects, or any other idea useful for filtering relevant media objects to display in view 624.

Selection panel 604 further comprises filter selections 620-622. Filter selections 620-622 may represent events, entities, thoughts, ideas or other concepts. Media objects 628-636 displayed in view 624 are relevant to filter selections 620-622. A user may add filter selections 620-622 to selection panel 604. Potential filter selections 620-622 may also be proposed based on an analysis of a user's viewing history, disclosed preferences, and other characteristics. In one or more embodiments, a user may configure a user profile to specify user characteristics, preferences, interests, and other characteristics usable to provide filter selections 620-622. Filter selections 620-622 may be found and added using a search interface 614.

Relationship metadata may be used to determine media objects to display for each filter selection. In one or more embodiments, a content indexing service provides access to media objects related to a concept represented by a filter selection. Neural networks, heuristics, semiotic algorithms, semantic algorithms, relational databases, indexing, and any other computational technique may be used to determine and store relationship information associating concepts and media objects.

Navigation display 600 further comprises main display panel 606. Main display panel 606 may include user information, such as user identification 608 and user properties 610. User properties 610 may include credit information, rating information, or any other information about a user. Main display panel 606 further comprises one or more browsing buttons 612-616. Browsing buttons 612-616 may be selected through a human interface device. Browsing buttons 612-616 may be configured to provide access to features of the navigable environment. For example, button 612 provides access to a home location specified by a user, button 614 provides access to popular content, and button 616 provides access to content associated with events. Browsing buttons 612-616 may activate additional menu selections. Browsing buttons 612-616 may also change a location displayed in environment display panel 602.

Navigation display 600 may include a messaging tool for sending messages to one or more recipient users. In one or more embodiments, the messaging tool allows a user to send a message containing a media object or a link to a media object for the recipient user to access. The included media object may be created by the sender or created by another user, including sponsored content. A sender may be provided an incentive to send messages that include sponsored content. In one or more embodiments, credits are earned and/or spent to send or view content, depending on incentives built into the system as well as monetization schemes built into the system.

Navigation display 600 may include at least one indicator 626. Indicator 626 comprises any displayable indicator describing view 624. The information provided may include, but is not limited to an orientation, a spatial location, a map, a zoom factor, a direction, a timeline, a clock, a calendar, an elevation, and/or any other information that describes view 624. Such information provides a context the user can use to understand where he is browsing within the navigable environment. In one or more embodiments, indicator 626 may be used to navigate the navigable environment.

Figure 7:
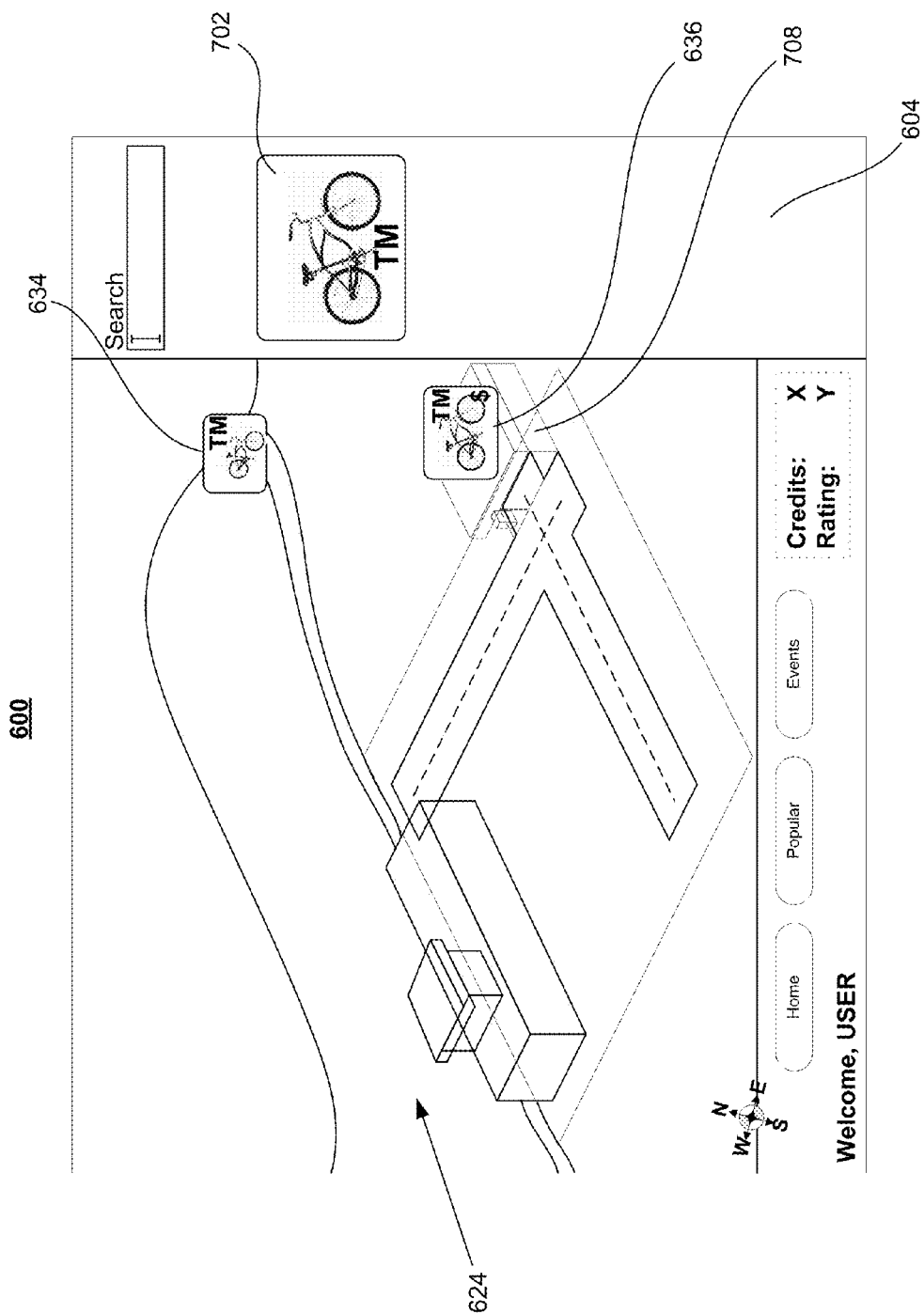
FIG. 7 illustrates sponsored content in an exemplary navigable environment in accordance with systems and methods to create and provide media objects in a navigable environment.

FIG. 7 illustrates sponsored content in an exemplary navigable environment in accordance with systems and methods to create and provide media objects in a navigable environment. Referring to FIG. 6, exemplary filter selection 620 is directed to bicycles. Media objects 628, 630, 634 and 636 are displayed in view 624 because of their relevance to filter selection 620. Filter selection 622 is directed to parks. Media objects 630 and 632 are displayed in view 624 because of their relevance to filter selection 622. Two media objects 634 and 636 are related to a specific bicycle brand TM. One media object 636 is sponsored content.

In FIG. 7, display navigation display 600 is shown when a different set of filter selections is shown in content selection panel 604. Content selection panel 604 now contains filter selection 702, which is directed to a specific bicycle brand TM. As a result, only media objects 634 and 636 are displayed in view 624. Because filter selection 702 specifies a brand, bicycle-related media objects 628 and 630 which are not associated with the bicycle brand are no longer displayed in view 624.

Sponsored media object 706 is displayed in view 624 because of its relevance to filter selection 702. In the exemplary figure, sponsored media object 706 comprises sponsored content associated with the specific bicycle brand TM. Sponsored media object 706 may include capture metadata that specifies a location determined by the sponsoring entity. For example, sponsor media object 706 may be recorded by a storeowner at a store location 708 that sells specific bicycle brand TM.

Figure 2:
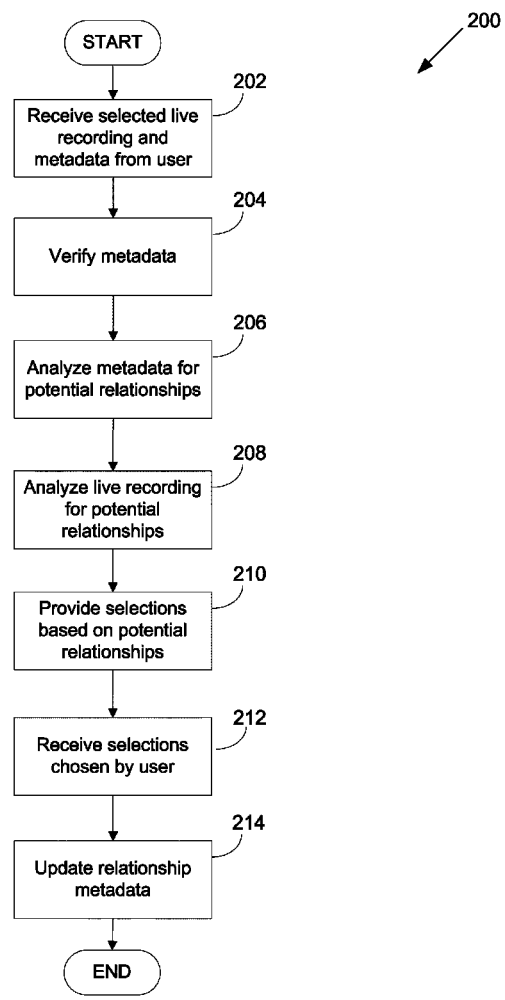
FIG. 2 illustrates a process comprising steps for accepting a new media object in accordance with one or more embodiments of systems and methods to create and provide media objects in a navigable environment.

FIG. 2 illustrates a process comprising steps for accepting a new media object in accordance with one or more embodiments of systems and methods to create and provide media objects in a navigable environment.

Process 200 begins at step 202, where a selected live recording and metadata is received from a user. In one or more embodiments, the live recording is a short clip of live media recorded by a media capture device. In one or more embodiments, a length of recorded media is less than or equal to about 60 seconds. The length of recorded media may be further limited to less than or equal to about 30 seconds. The metadata may include capture metadata comprising information collected at the time of a recording. The metadata may also include author metadata comprising information associated with the creator of the live recording. The metadata may also include an initial set of relationship metadata that identifies relationships between a media object and concepts and/or other media objects. The initial set of relationship data may be provided by the user, such as a caption provided by the user.

Process 200 continues to step 204, where the metadata is verified. The metadata may include a digital fingerprint that provides verifiable authorship information. Authorship may be verified by requiring user authentication by one of any method of authentication known in the art. Furthermore, the metadata may be verified to ensure the recording is a live recording. Furthermore, the submission may be verified to ensure that submitted live recordings conform to a uniform standard for every media object handled by a system, such as file format, size, quality, length, and any other characteristic of a digital media recording. In one or more embodiments, the live recording is verified to ensure that the recording conforms to community standards, such as the exclusion of offensive or profane material. In one or more embodiments, verification is exclusively computational. A person who screens material submitted in accordance with the method may also perform one or more verifications.

Process 200 continues to step 206, where the metadata is analyzed for potential relationships. Extrinsic information that is linkable to metadata, including a time and/or location, may be used to generate additional metadata. Extrinsic information that is linkable to capture metadata may include news events, accidents, scheduled events, event information, sponsored events, promotional events, map information, location information, and any other extrinsic information.

Process 200 continues to step 208, where the live recording is analyzed for potential relationships. The live recording may be preprocessed to enhance the recorded data, such as by image stabilization, sound and image filtering, adjusting a parameter such as volume, white balance and brightness, and any other media processing. The live recording may be analyzed using object tracking, object recognition, speech recognition. The analysis may also be used to flag inappropriate media. In one or more embodiments, verification is exclusively computational. A person who screens material submitted in accordance with the method may also perform one or more verifications.

Process 200 continues to step 210, where selections are provided based on potential relationships. Selections represent ideas, events, media objects, or any other concept usable to associate relationship metadata with a media object. Selections may represent categories, activities, ideas, events, locations, or any other potentially relevant concept. In one or more embodiments, selections are other media objects that are potentially relevant to the media object being created.

In one or more embodiments, selections are provided after at least an initial portion of a media object, such as metadata and/or an initial portion of recorded media, is received. Transferring an initial portion of a media object allows for the immediate analysis of the initial portion such that the immediate analysis is complete before the completion of the recording. This allows the selections to be provided immediately after a user completes the recording. The remaining portion of the media object, including any remaining portion of recorded media and any remaining metadata, may be subsequently received to complete the new media object.

In one or more embodiments, one or more selections may be sponsored media. Sponsored media may be designated by a sponsorship icon or any other indicator to notify an author that the selection is associated with sponsored content. Sponsored media comprises media objects submitted by a sponsor user for a fee. A sponsor user may be an individual, a group, a non-profit, a business entity, a government, or any other entity. Sponsored media may comprise media objects as well as ideas, events, or any other concept usable to associate relationship metadata with a media object. The fee paid by a sponsor user may be based on a subscription, a number of media objects, a number of views, a number of selections, a quantified measure of popularity, a quantified measure of connectivity, or any other payment scheme. An author may be provided an incentive to associate sponsored media with the new media object.

Process 200 continues to step 212, where selections chosen by the user are received. Process 200 continues to step 214, where relationship metadata is updated based on the selections chosen by the user that affirms a potential relationship. Process 200 terminates after step 214.

While the invention herein disclosed has been described by means of specific embodiments and applications thereof, numerous modifications and variations could be made thereto by those skilled in the art without departing from the scope of the invention set forth in the claims.

What is claimed is:

1. A method for receiving and storing media objects in a navigable environment implemented on at least one computer executing computer readable program code stored in a tangible memory medium, wherein said at least one computer is configured to:
   receive a live recording comprising video selected by an author, wherein said live recording is recorded on a media capture device;
   receive capture metadata associated with said live recording, wherein said capture metadata is metadata collected by said media capture device comprising a location of recording, a time of recording, and an orientation of said media capture device;
   receive author metadata comprising information about said author;
   analyze said capture metadata and said author metadata to determine at least one potential relationship with data consisting of news events, accidents, scheduled events, event information, sponsored events, promotional events, map information, and location information;
   provide at least one selection to a user, wherein said at least one selection comprises said at least one potential relationship;
   receive at least one selected relationship from said user;
   associate said at least one selected relationship with said live recording, wherein said at least one selected relationship is stored as relationship metadata;
   create a media object comprising said live recording, said capture metadata, said author metadata and said relationship metadata; and
   providing said media object as one of a plurality of relevant media objects in a view of a virtual navigable environment comprising a time dimension and at least one other dimension, wherein a user may change a selected position in said time dimension and said at least one other dimension, and wherein said plurality of relevant media objects is determined based on proximity to said selected position in said time dimension and said at least one other dimension.

2. The method of claim 1, wherein said author metadata comprises at least one of email, calendar, social information, group affiliation, event participation, and purchase information associated with at least one of said media capture device and a user account associated with said author.

3. The method of claim 1, wherein said at least one computer is further configured to verify an authenticity of at least one piece of metadata.

4. The method of claim 1, wherein said at least one selection comprises a selection associated with a sponsor.

5. The method of claim 1, wherein said at least one potential relationship comprises a potentially related media object.

6. The method of claim 1, wherein said at least one computer is further configured to update said relationship metadata with new relationship data processed after creation of said media object.

7. The method of claim 1, wherein said at least one computer is further configured to receive an initial portion of said live recording, said capture metadata and said author metadata for immediate analysis to determine said at least one selection, wherein said initial portion is received after a starting time of said live recording and wherein said at least one selection is provided before or immediately after an ending time of said live recording.

8. The method of claim 1, wherein said media capture device is configured to extract additional metadata based using at least one of image processing hardware and image processing software configured to perform at least one task selected from the group of image stabilization, image and sound filtering, object tracking, object recognition, speech recognition, detecting inappropriate media, and adjusting a recording parameter.

9. The method of claim 1, further comprising extracting additional metadata based using image processing software configured to perform at least one task selected from the group of image stabilization, image and sound filtering, object tracking, object recognition, speech recognition, detecting inappropriate media, and adjusting a recording parameter.

10. The method of claim 1, further comprising providing at least one reference path associated with at least one of said plurality of relevant media objects, wherein said reference path comprises comprising a plurality of positions in said at least one other dimension over time.

11. A method for storing and providing media objects in a navigable environment implemented on at least one computer executing computer readable program code stored in a tangible memory medium, wherein said at least one computer is configured to:
   access a plurality of media objects, each media object comprising a media recording, capture metadata, and author metadata;
   analyze said capture metadata and said author metadata for each of said plurality of media objects to determine at least one potential relationship with data consisting of news events, accidents, scheduled events, event information, sponsored events, promotional events, map information, and location information;
   provide at least one selection to a user, wherein said at least one selection comprises said at least one potential relationship;
   receive at least one selected relationship from said user;
   associate said at least one selected relationship with said a corresponding one of said plurality of media objects, wherein said at least one selected relationship is stored as relationship metadata;
   generate an index of said plurality of media objects based on said relationship metadata, capture metadata and author metadata;
   provide a view of a navigable virtual environment comprising a time dimension and at least one other dimension, wherein a user may change a selected position in said time dimension and said at least one other dimension, and wherein said plurality of relevant media objects is determined based on proximity to said selected position in said time dimension and said at least one other dimension; and provide at least one media object in said view, wherein one or more of said at least one media object comprises a reference path, wherein the reference path includes an orientation and location that changes over time.

12. The method of claim 11, wherein said at least one media object is provided as a media preview object, each media preview object comprising a representation of a media object with a smaller file size than said media object.

13. The method of claim 11, wherein said navigable virtual environment is a virtual representation of an organized event.

14. The method of claim 11, wherein said view is a playable view comprising a reference path comprising an orientation and a location within said navigable virtual environment.

15. The method of claim 11, wherein said wherein said at least one computer is further configured to update said index based on new relationship information.

16. The method of claim 11, wherein said at least one computer is further configured to use at least one filter selection to filter said at least one media object provided, wherein said at least one media object provided comprises relevant media objects which are relevant to said at least one filter selection.

17. The method of claim 16, wherein said at least one filter selection comprises a sponsor filter selection.

18. The method of claim 17, wherein said at least one computer is further configured to provide an incentive to a user to view sponsored content which is relevant to said sponsor filter selection.

19. A non-transitory computer readable medium comprising computer executable program code for generating media objects in a navigable environment, said computer executable program code comprising instructions to:

generate a live recording comprising captured video data, wherein said captured data is recorded using at least one recording device;

accept a choice of a selected portion of said live recording by a user;

generate capture metadata associated with said selected portion of said live recording, wherein said capture metadata comprises a location, a time and an orientation associated with said selected portion of said live recording;

generate author metadata comprising information about said user;

provide object data comprising said selected portion of said live recording, said capture metadata and said author metadata for analysis to determine at least one potential relationship with data consisting of news events, accidents, scheduled events, event information, sponsored events, promotional events, map information, and location information;

provide at least one selection from said potential relationship in response to said object data;

accept at least one chosen selection from said user through an interface;

associate said at least one chosen selection with said live recording, wherein said at least one selected relationship is stored as relationship metadata;

create a media object comprising said live recording, said capture metadata, said author metadata and said relationship metadata;

provide said media object as one of a plurality of relevant media objects, wherein said relevant media objects are selected based on a position in a time dimension and at least one other dimension associated with a navigable environment; and display said plurality of relevant media objects in a view of said navigable environment.

20. The non-transitory computer readable medium of claim 19, wherein said live recording is stored in a portion of said non-transitory computer readable memory, wherein said portion comprises a predetermined size for storing continuously recorded live media, and wherein older recorded data is discarded when a size of said live recording reaches said predetermined size.

* * * * *